United States Patent
Rieck (10) Patent No.: US 9,821,548 B2
(45) Date of Patent: Nov. 21, 2017

(54) INTERMEDIATE TRANSFER FILM HAVING SUBSTANTIALLY TRANSPARENT ALIGNMENT MARKS

(71) Applicant: Assa Abloy AB, Stockholm (SE)

(72) Inventor: James A. Rieck, Brooklyn Park, MN (US)

(73) Assignee: Assa Abloy AB, Stockholm (SE)

( * ) Notice: Subject to any disclaimer, the term of this patent is extended or adjusted under 35 U.S.C. 154(b) by 0 days.

(21) Appl. No.: 15/313,706

(22) PCT Filed: Jun. 11, 2014

(86) PCT No.: PCT/US2014/041852
§ 371 (c)(1),
(2) Date: Nov. 23, 2016

(87) PCT Pub. No.: WO2015/191058
PCT Pub. Date: Dec. 17, 2015

(65) Prior Publication Data
US 2017/0165957 A1    Jun. 15, 2017

(51) Int. Cl.
*B41J 2/005* (2006.01)
*B41J 2/325* (2006.01)
(Continued)

(52) U.S. Cl.
CPC .......... *B41J 2/0057* (2013.01); *B32B 37/025* (2013.01); *B41J 2/325* (2013.01);
(Continued)

(58) Field of Classification Search
CPC .......... B41J 2/0057; B41J 2/325; B41M 3/12; B41M 5/38257; B41M 7/0027; B41M 2205/10; B41M 2205/20; B32B 37/025; B32B 37/142; B32B 38/18; G03G 5/142; Y10S 428/914
See application file for complete search history.

(56) References Cited

U.S. PATENT DOCUMENTS 5,608,507 A * 3/1997 Nguyen .................. G03G 5/142
399/307
5,634,731 A * 6/1997 Kita ......................... B41J 2/325
347/213
(Continued)

FOREIGN PATENT DOCUMENTS

EP    1188570 A2    3/2002
EP    2018275 A1    1/2009
(Continued)

OTHER PUBLICATIONS

International Search Report and Written Opinion of PCT/US2014/041852, dated Mar. 19, 2015.

*Primary Examiner* — Anh T. N. Vo
(74) *Attorney, Agent, or Firm* — Westman, Champlin & Koehler, P.A.; Brian D. Kaul (57) ABSTRACT

An intermediate transfer film for use in a transfer lamination device includes a carrier layer, a transfer layer on the carrier layer, and a plurality of alignment marks supported on the carrier layer. The transfer section is configured to be transferred from the carrier layer to a substrate through a transfer lamination operation. Each alignment mark is substantially transparent to visible light and absorbs infrared light.

9 Claims, 4 Drawing Sheets (51) Int. Cl.
*B41M 7/00* (2006.01)
*G03G 5/14* (2006.01)
*B32B 37/00* (2006.01)
*B41M 5/382* (2006.01)

(52) U.S. Cl.
CPC ...... *B41M 5/38257* (2013.01); *B41M 7/0027* (2013.01); *G03G 5/142* (2013.01)

(56) References Cited

U.S. PATENT DOCUMENTS

| | | | |
|---|---|---|---|
| 6,097,415 A * | 8/2000 | Kita | B41J 2/32 347/213 |
| 6,106,910 A | 8/2000 | Tan et al. | |
| 6,284,708 B1 | 9/2001 | Oshima et al. | |
| 6,773,772 B2 | 8/2004 | Shinozaki et al. | |
| 6,876,374 B2 * | 4/2005 | Miyazaki | B41J 2/355 347/172 |
| 7,223,031 B2 | 5/2007 | Countryman et al. | |
| 7,639,269 B2 * | 12/2009 | Mizukami | B41J 2/0057 347/213 |
| 7,870,824 B2 | 1/2011 | Helma et al. | |

FOREIGN PATENT DOCUMENTS

| | | | |
|---|---|---|---|
| WO | 2007135403 | A1 | 11/2007 |
| WO | 2008108925 | A1 | 9/2008 |
| WO | 2014022088 | A1 | 2/2014 |
| WO | 2015191058 | A1 | 12/2015 |

* cited by examiner

INTERMEDIATE TRANSFER FILM HAVING SUBSTANTIALLY TRANSPARENT ALIGNMENT MARKS

CROSS-REFERENCE TO RELATED APPLICATION

This Application is a Section 371 National Stage Application of International Application No. PCT/US2014/041852, filed Jun. 11, 2014 and published as WO 2015/191058 A1 on Dec. 17, 2015, in English, the content of which is hereby incorporated by reference in its entirety.

BACKGROUND

Credentials include identification cards, driver's licenses, passports, and other documents. Such credentials are formed from credential or card substrates including paper substrates, plastic substrates, cards and other materials. Such credentials generally include printed information, such as a photo, account numbers, identification numbers, and other personal information. Credentials can also include data that is encoded in a smartcard chip, a magnetic stripe, or a barcode, for example.

Credential production devices process credential substrates by performing at least one processing step in forming a final credential product. One such process is a transfer or lamination process that transfers a material to a surface of the card substrate using a heated transfer roller of a transfer unit of the device. This process can be used to transfer an image to the surface of the card substrate and/or provide protection to the surface of the card substrate from abrasion and environmental conditions, for example.

Intermediate transfer films or transfer ribbons include a fracturable laminate or transfer layer, which is often referred to as a "thin film laminate," that can be transferred to a surface of a card substrate using the heated transfer roller. Such transfer layers are generally continuous resinous materials that have been coated onto a continuous carrier layer or backing to form a transfer ribbon. The side of the resin material that is not attached to the continuous carrier layer is generally coated with a thermal adhesive which is used to create a bond between the resin and the surface of the substrate. The transfer roller is used to thermally activate the adhesive and press the resinous material against the surface of the substrate to bond the material to the surface. The carrier layer or backing is removed to complete the lamination process.

The transfer layer may also be in the form of a print intermediate, on which an image may be printed in a reverse-image printing process. In the reverse-image printing process, a print head is registered with a transfer section of the transfer layer, and an image is printed to the transfer section using the print head. Next, the imaged transfer section is registered with the card substrate and/or the transfer roller. The transfer roller is then used to activate the adhesive of the imaged transfer section causing the imaged transfer section to bond to the surface of the card substrate. The carrier layer or backing of the overlaminate material is then removed from the bonded imaged transfer section to complete the transfer of the image to the card substrate.

Figure 7:
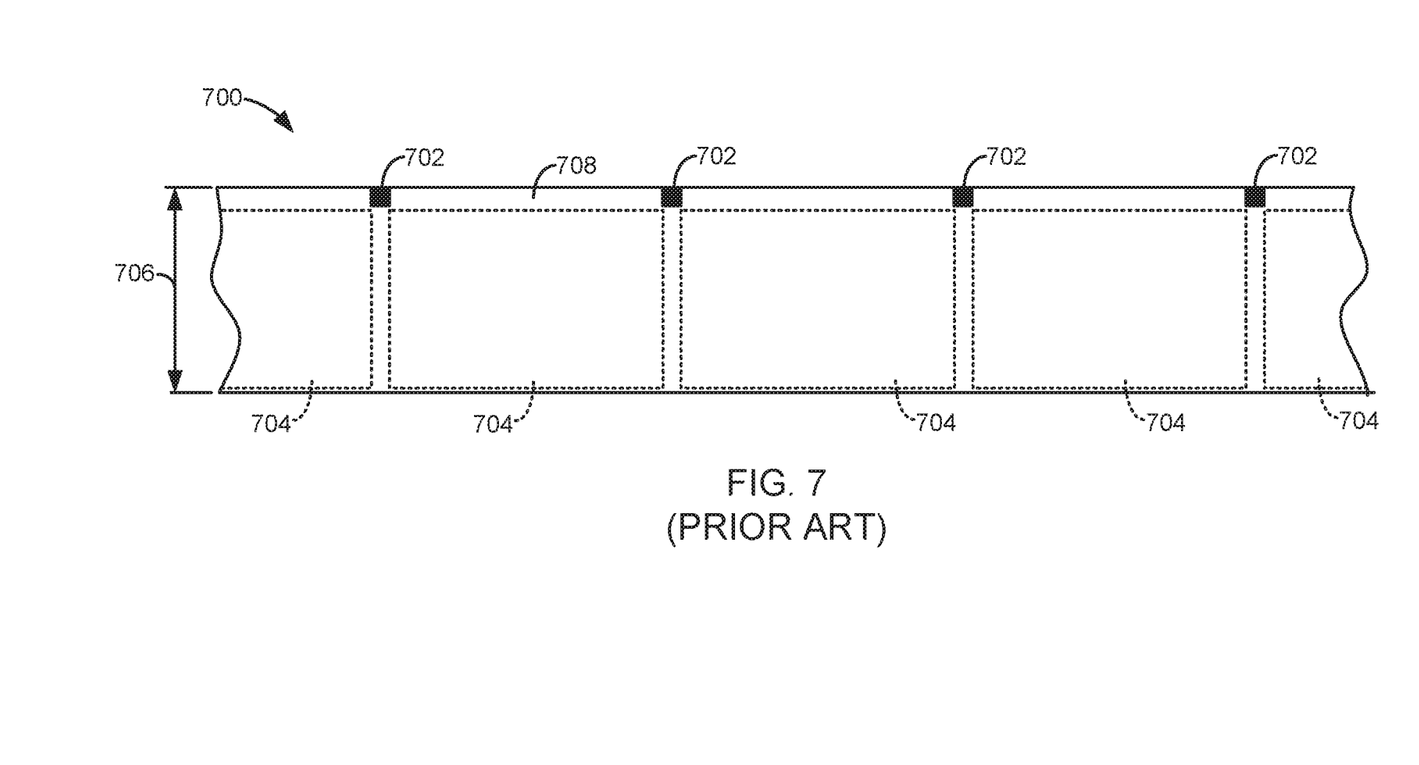
FIG. 7 is a simplified top plan view of an intermediate transfer film or transfer ribbon in accordance with the prior art.

FIG. 7 is a simplified top plan view of an intermediate transfer film or transfer ribbon 700 in accordance with the prior art. The conventional transfer ribbon 700 includes black registration or alignment marks 702 that are used by the credential production device to register the transfer sections 704 of the transfer layer to the print head, card substrate and/or transfer roller. The registration process generally involves detecting the marks 702 using an optical sensor as the ribbon 700 is fed relative to a component of the device, such as the print head, the transfer roller, or the substrate. Typically, a transfer section 704 is registered with the desired component upon detection of one of the marks 702.

The marks 702 generally comprise a black resin or other black material that is printed to the transfer ribbon 700. The marks 702 are located outside the boundaries of the transfer sections 704 to prevent the marks 702 from transferring to the substrate during the transfer or lamination process, which would produce undesirable marks on the substrate. As a result, the width 706 of the ribbon 700 must be made sufficiently wide to accommodate both the marks 702 and the transfer sections 704. This results in significant waste of the transfer layer, as at least the portion 708 of the transfer ribbon 700 along the lengthwise boundary of the transfer sections 704 is never used.

The transfer ribbon 700 is slightly thicker at the locations of the marks 702 due to the thickness of the marks 702. When the transfer ribbon 700 is wound on a spool, the marks 702 cause a thicker ridge to form on one side of the spool. This can cause uneven tension in the transfer ribbon 700 as it is unwound from a supply spool, or wound onto a take-up spool of the credential production device. As a result, the transfer ribbon 700 is prone to wrinkling during use in the credential production device, which can adversely affect the quality of the image that is transferred to the substrate.

SUMMARY

Embodiments of the invention are directed to an intermediate transfer film for use in a transfer lamination device, and a method of using the intermediate transfer film in a transfer lamination device. Some embodiments of the intermediate transfer film include a carrier layer, a transfer layer, and a plurality of alignment marks. The transfer layer is supported or attached to the carrier layer, and is configured to be transferred from the carrier layer to a substrate through a transfer lamination operation. The alignment marks are supported on the carrier layer. Each alignment mark is substantially transparent to visible light and absorbs infrared light.

Some embodiments of the method involve operating a transfer printer that includes a print unit, a transfer unit, and an intermediate transfer film having a carrier layer and a transfer layer. In the method, a print section of the transfer layer is aligned to the print unit. In some embodiments, this involves detecting one of the alignment marks supported on the carrier layer, which are substantially transparent to visible light and absorb infrared light. Also in the method, an image is printed to the transfer section using the print unit. The transfer section is then transferred to a substrate using the transfer unit.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
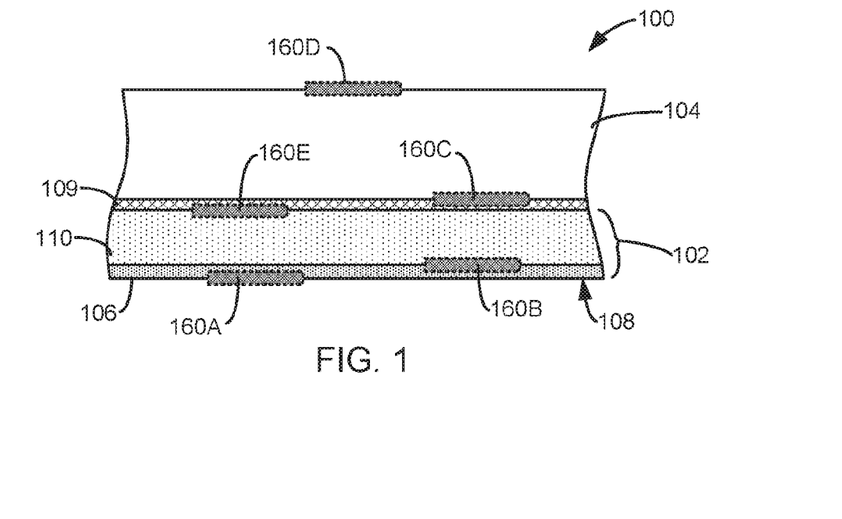
FIG. 1 is a simplified side cross-sectional view of an exemplary transfer ribbon in accordance with embodiments of the invention.

FIG. 1 is a simplified side cross-sectional view of an exemplary intermediate transfer film or transfer ribbon 100 in accordance with embodiments of the invention. In some embodiments, the transfer ribbon 100 includes a transfer layer 102 that is attached to a backing or carrier layer 104. The transfer layer 102 is configured to be transferred to a surface of a substrate through a transfer lamination process in accordance with embodiments of the invention.

In some embodiments, the transfer layer 102 is in the form of a fracturable laminate or thin film laminate. In some embodiments, the transfer layer 102 includes an image receptive layer 106 that is configured to receive an image on the surface 108. The image may be printed to the surface 108 in accordance with conventional techniques, such as through dye sublimation or inkjet printing processes.

The transfer ribbon 100 may include other conventional layers or materials that are not shown in order to simplify the illustration. These include a thermal adhesive in the image receptive layer 106, or a thermal adhesive layer on the image receptive layer 106. The thermal adhesive is activated during a transfer lamination process to bond the transfer layer 102 to a substrate.

The transfer ribbon 100 may also include a release layer 109 between the transfer layer 102 and the carrier layer 104. The release layer simplifies the release of the transfer layer 102 from the carrier layer 104 during a transfer lamination process.

In some embodiments, the transfer layer 102 includes a protective layer 110 located between the image receptive layer 106 and the carrier layer 104. Alternatively, the protective layer 110 may be combined with the image receptive layer 106. In some embodiments, the protective layer 110 includes one or more resins. The protective layer 110 operates to provide protection to the surface on which the transfer layer 102 is laminated. The protective layer 110 will also protect an image printed on or in the image receptive layer 106 when the transfer layer 102 is laminated to the substrate.

Figure 2:
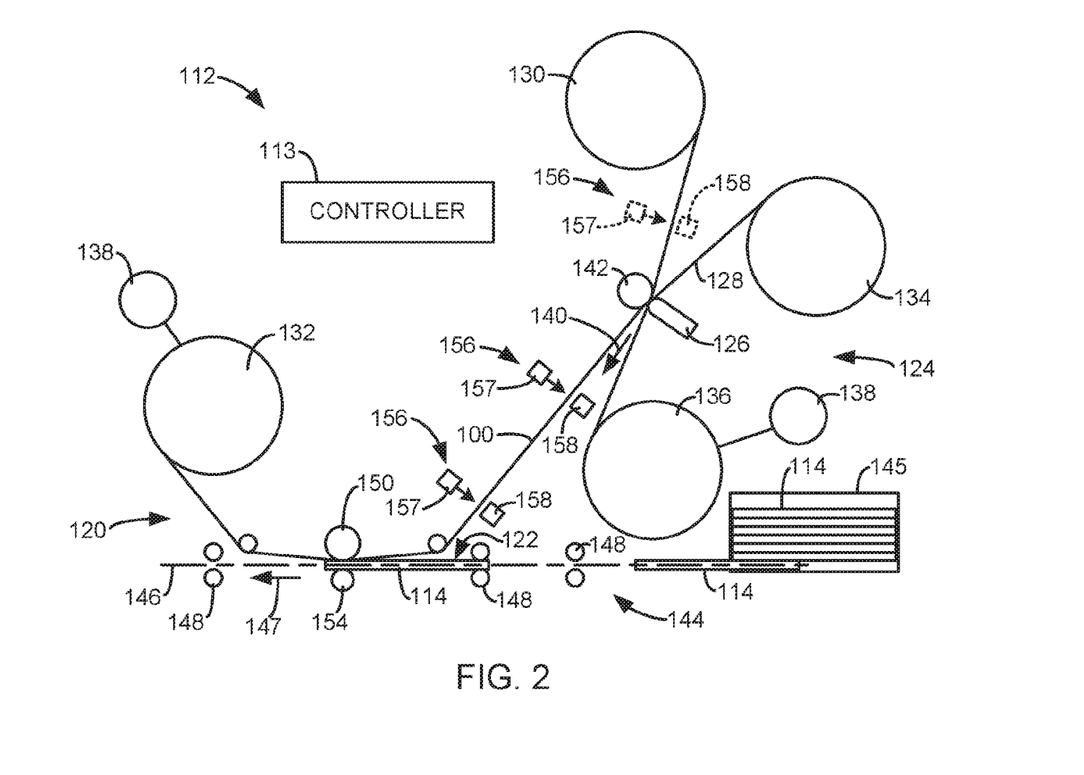
FIG. 2 is a simplified side view of an exemplary transfer lamination device in accordance with embodiments of the invention.

FIG. 2 is a simplified side view of an exemplary transfer lamination device 112 in accordance with embodiments of the invention. Motors, gears, circuitry and other conventional components may not be depicted in FIG. 2 in order to simplify the illustration.

In some embodiments, the device 112 includes a controller 113, which comprises at least one processor. In some embodiments, the controller 113 uses the at least one processor to execute program instructions stored in memory of the controller 113 or other memory, to control components of the device 112 to perform functions and method steps described herein to process a substrate 114.

The substrate 114 may take on many different forms, as understood by those skilled in the art. In some embodiments, the device 112 is in the form of a credential manufacturing device configured to produce credentials, such as driver's licenses, by processing a credential substrate 114 using the methods described herein. In some embodiments, the substrate 114 is a credential substrate. As used herein, the term "credential substrate" includes substrates used to form credentials, such as identification cards, membership cards, proximity cards, driver's licenses, passports, credit and debit cards, and other credentials or similar products. Exemplary card substrates include paper substrates other than traditional paper sheets used in copiers or paper sheet printers, plastic substrates, rigged and semi-rigged card substrates and other similar substrates.

In some embodiments, the device 112 includes a transfer unit 120, which is configured to transfer a portion (i.e., a transfer section) of the transfer layer 102 to a surface 122 of the substrate 114. In some embodiments, the device 112 includes a print unit 124, which is configured to print an image to the surface 108 of the image receptive layer 106 of the transfer section of the transfer layer 102, before it is transferred to the surface 122 of the substrate 114 using the transfer unit 120.

In some embodiments, the print unit 124 includes a conventional thermal print head 126 comprising a plurality of heating elements that may be individually activated. In some embodiments, the print unit 124 includes a conventional thermal print ribbon 128, which may comprise a plurality of conventional print panels, such as colored dye panels, black resin panels, and/or other conventional print panels. In some embodiments, the transfer ribbon 100 is supported between a supply spool 130 and a take-up spool 132, and the print ribbon 128 is supported between a supply spool 134 and a take-up spool 136. In some embodiments, the device 112 includes one or more motors 138 that are configured to drive rotation of the take-up spools 132 and 136 to feed the transfer ribbon 100 and the print ribbon 128 in a feed direction indicated by arrow 140, in accordance with conventional techniques. Other motors may be used to drive rotation of the supply spools 130 and 134 to reverse the feeding of the transfer ribbon 100 and the print ribbon 128.

In some embodiments, the controller 113 of the device 112 controls the motors 138 to align a desired print panel of the print ribbon 128 with a transfer section of the transfer layer 102 to commence a print operation. Once the print ribbon 128 is properly aligned with the transfer ribbon 100, a print operation may commence. In some embodiments, a conventional mechanism drives the print head 126 to press the print ribbon 128 against the surface 108 of the transfer layer 102 under the support of a platen roller 142, as shown in FIG. 2. The heating elements of the print head 126 are then individually activated and deactivated as the print ribbon 128 and the transfer ribbon 100 are fed in the direction 140. This process may be repeated multiple times using different print panels of the print ribbon 128 to produce the desired image on or in the surface 108 of the image receptive layer 106 of the transfer section, in accordance with conventional techniques.

In a transfer operation, the transfer section, which may or may not include a printed image, is transferred to the surface 122 of the substrate 114 using the transfer unit 120. In some embodiments, the device 112 includes a conventional transport mechanism 144 and a substrate supply 145 (e.g., hopper or cartridge), which contains a plurality of the substrates 114. In some embodiments, the controller 113 controls the transport mechanism 144 to feed individual substrates 114 from the supply 145 along a processing path 146 in a feed direction 147. In some embodiments, the transport mechanism 144 includes motorized rollers 148, such as pinch roller pairs, or other conventional components to feed the cards 114 along the path 146.

In some embodiments, the transfer lamination process begins by performing an alignment process, in which a desired transfer section of the transfer layer 102 is aligned with a substrate 114 that is presented to the transfer unit 120 along the processing path 148. In some embodiments, the controller 113 controls the feeding of the transfer ribbon 100 using the motor 138, and the feeding of the substrate 114 along the path 146 using the transport mechanism 144, to align the transfer section of the transfer layer 102 with the substrate 114 and complete the alignment process.

Figure 3:
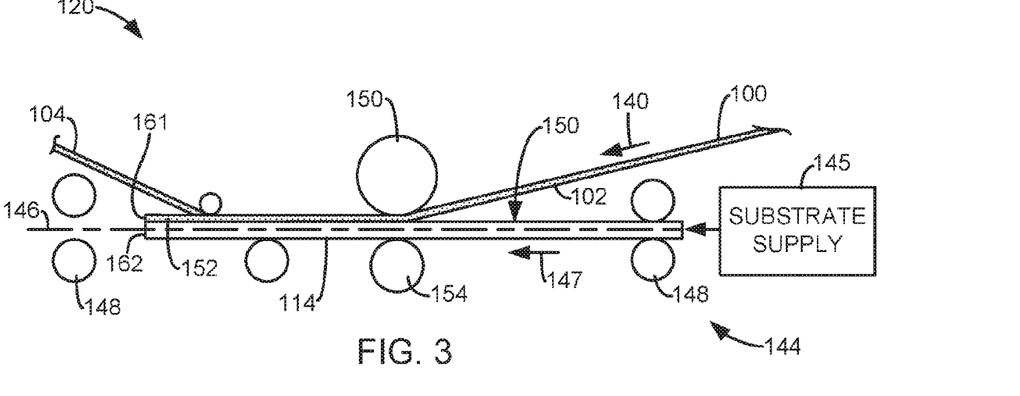
FIG. 3 is a simplified side view of a transfer unit performing a transfer lamination operation in accordance with embodiments of the invention.

In some embodiments, the transfer unit 120 includes a heated transfer roller 150 that is configured to transfer the transfer section 152 to the surface 122 of the substrate 114, with which it has been aligned, as shown in the simplified side view of the transfer unit 120 provided in FIG. 3. During the transfer lamination operation, the transfer roller 150 presses the transfer section 152 against the surface 122 of the credential substrate 114, which is supported on a platen roller 154, and heats the transfer section 152 including the adhesive of the transfer layer 102 to bond the transfer section 152 to the surface 122 of the substrate 114. As the substrate 114 and the transfer ribbon 100 are fed past the transfer roller 150, the carrier layer 104 is pulled from the transfer section 152 that has bonded to the surface 122. Portions of the transfer layer 102 that do not bond to the surface 122, such as portions on the sides of the transfer section 152, remain adhered to the carrier layer 104. After the transfer section 152 has been transferred from the ribbon 100 to the surface 122 of the substrate 114, the processed substrate 114 may be discharged from the device 112 and into a hopper, for example.

Embodiments of the invention are directed to an intermediate transfer film or ribbon 100 having features that facilitate the alignment of a transfer section 152 of the ribbon 100 with a desired object, such as a panel of a print ribbon 128, the print head 126, the transfer roller 150, or a substrate 114, for example. Additional embodiments are directed to a method of using the transfer ribbon 100 formed in accordance with embodiments of the present invention in an alignment process, and in a transfer lamination or transfer printing process.

Figure 4:
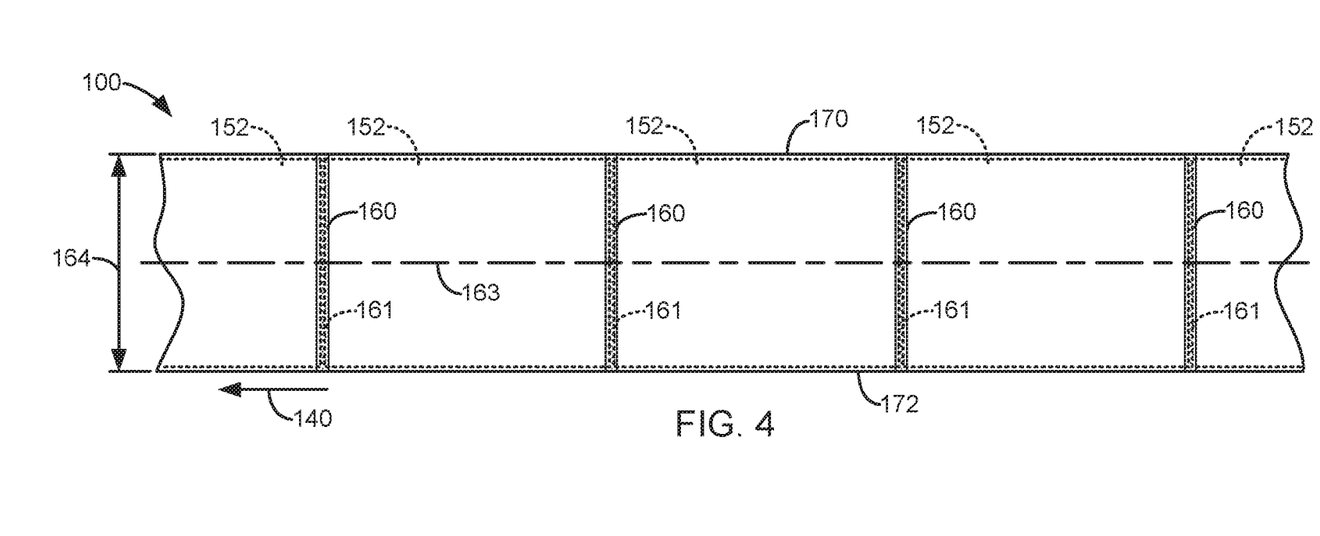
FIGS. 4 and 5 are simplified top plan views of an intermediate transfer film in accordance with embodiments of the invention.
Figure 5:
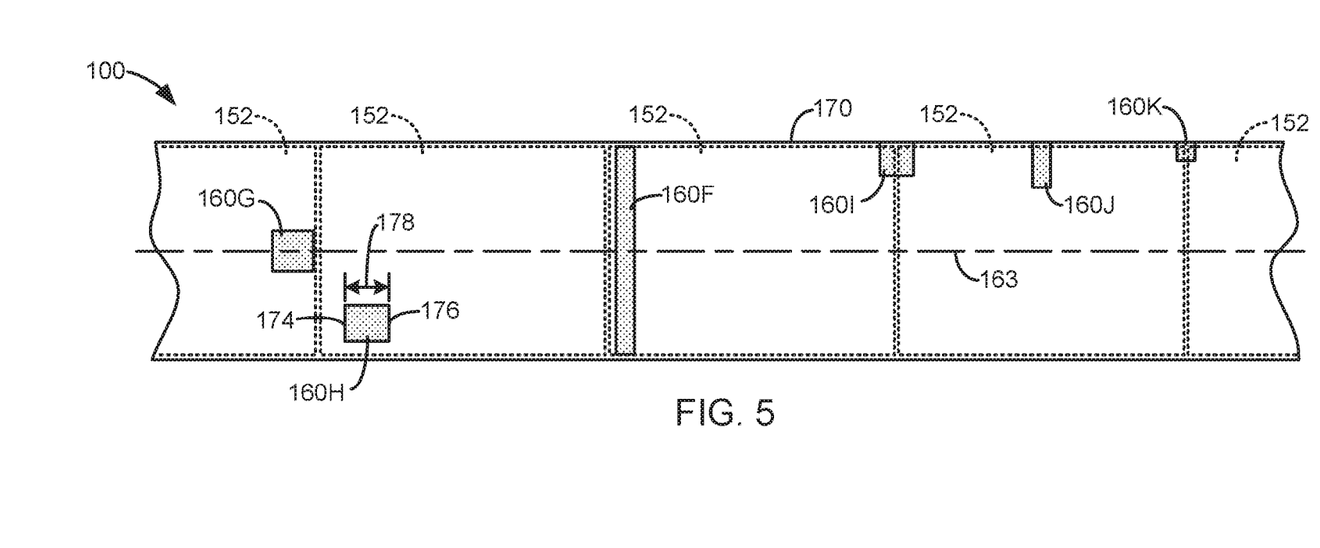

FIGS. 4 and 5 are simplified top plan views of an intermediate transfer film 100 in accordance with embodiments of the invention. In some embodiments, the intermediate transfer film 100 includes a carrier layer 104 and a transfer layer 102 attached to the carrier layer 104, as illustrated in FIG. 1. Embodiments of the film 100 also include one or more other embodiments described above.

In some embodiments, the intermediate transfer film 100 includes a plurality of alignment marks, generally referred to as 160, that are supported on, or attached to the film 100 or the carrier layer 104. The alignment marks 160 facilitate the process of aligning a transfer section 152 of the intermediate transfer film 100 with the desired object (e.g., a print panel, substrate, etc.). It should be understood, that the dashed boxes depicting the transfer sections 152 on the intermediate transfer film 100 are not visible on the transfer layer 102. Rather, the controller 113 of the device 112 performs the alignment process by detecting the marks 160. The location of one of the transfer sections 152 associated with a detected mark 160 may be determined in accordance with conventional techniques.

In some embodiments, each transfer section 152 includes a leading edge 161 relative to the feed direction 140, as shown in FIG. 4. The alignment process for aligning the transfer section 152 to a substrate 114 generally involves aligning the leading edge 161 of the transfer section 152 with a leading edge 162 of the substrate 114. This alignment causes the leading edge 161 of the transfer section 152 to approximately line up with the leading edge 162 of the substrate 114 during the transfer lamination process, as shown in FIG. 3. Similarly, for the printing process, the leading edge 161 of a transfer section is generally aligned with a leading edge of a desired print panel of the print ribbon 128, before the print operation begins.

In some embodiments, the alignment marks 160 are substantially transparent to visible light and absorb infrared light. That is, the marks 160 are substantially invisible to the naked eye of a human. As a result, unlike transfer ribbons 700 of the prior art that include visible marks 702 (FIG. 7), the transfer layer 102 of the intermediate transfer film 100 in accordance with embodiments of the present invention, is substantially free of visible marks. In some embodiments, the marks 160 are formed by using an infrared absorbing ink. Exemplary infrared absorbing inks that could be used to form the marks 160 include Nepolin Spectre 340 and 350, wherein the resulting marks show an infrared absorption greater than 50% and a visible light absorption less than 5%. The alignment marks 160 may be formed on or in the intermediate transfer film 100 using any suitable technique, such as printing.

In some embodiments, the alignment marks 160 may be located at various locations on or within the intermediate transfer film 100. Exemplary embodiments of these locations are illustrated in FIG. 1. In some embodiments, the alignment marks 160 are formed on or in the intermediate transfer layer 102. For instance, an alignment mark 160 may be formed on or in the image receptive layer 106, as indicated by alignment mark 160A, or a mark 160 may be formed on or in the protective layer 110, as indicated by mark 160B. In some embodiments, the alignment marks 160 are formed on or in the carrier layer 104, as indicated by marks 160C and 160D. In some embodiments, the alignment marks 160 may be formed on or in the release layer 109, as indicated by mark 160E. In some embodiments, the alignment marks 160 are formed between the transfer layer 102 and the carrier layer 104, such as indicated by marks 160C and 160E, for example. It is this last kind of marks (160C or 160D) which is included in their products by most of the ribbons providers on the market.

It should be noted that while the mark 160D formed on the side of the carrier layer 104 that is opposite the transfer layer 102 would not be directly transferred to a substrate during a lamination operation, when the intermediate transfer film 100 is wound in a roll, the mark 160D, or a portion thereof, may transfer to the overlying transfer layer 102 and, thus, cause a mark 160A to be formed on the overlying transfer layer 102. As a result, the mark 160D may be indirectly transferred to a substrate through a transfer lamination operation. For this reason, it is beneficial to have the mark 160D formed of a material that is substantially invisible to the naked eye.

A mark as 160A positioned on the ink receptive layer, if introduced during the ribbon manufacturing, will also induce surface transfer issues when the ribbon is wound, de-wound and re-wound. For this reason, it is beneficial to have the mark 160A formed of a material that is substantially invisible to the naked eye. Alternatively, the mark 160A could be printed on the ribbon when the image is formed on the surface 108 (see U.S. Pat. No. 5,634,731 from Kita et al. for more details). Once again, it is advantageous to have such mark 160A printed of a material that is substantially invisible to the naked eye. To achieve this, the print ribbon 128 should include special print panels made of such a material.

The alignment marks are generally applied to the intermediate transfer film 100 at predefined intervals along a central axis 163 of the intermediate transfer film 100, as shown in FIG. 4. In some embodiments, each of the transfer sections 152 is located between consecutive alignment marks 160. In FIG. 5, various types of alignment marks 160 made in accordance with different embodiments of the invention are shown. Thus, the alignment marks 160 shown in FIG. 5 are generally single examples of alignment marks 160 formed in accordance with embodiments of the invention. Thus, an intermediate transfer film 100 formed in accordance with embodiments of the invention include one or more of the alignment marks 160 illustrated in FIG. 5 spaced along the central axis 163 at predetermined intervals in the manner illustrated in FIG. 4.

In some embodiments, each of the marks 160 includes at least a portion that is within a transfer section 152, which is configured to be transferred to a substrate 114. This feature is illustrated in FIG. 4, where the transfer section 152 overlies the marks 160. Additionally, each of the marks 160 illustrated in FIG. 5 includes at least a portion that is within the transfer sections 152. As a result, when the marks 160 are formed on or within the transfer layer 102 of the intermediate transfer film 100, the transfer section 152 that is transferred to the substrate 114 during a transfer operation includes at least a portion of the mark or marks 160 that are formed on or within the transfer section 152. However, due to the substantial transparency or invisibility of the marks 160 to visible light, the marks 160 have little impact on the appearance of an image that may have been printed to the transfer section 152 by the print unit 124.

One advantage to allowing the alignment marks 160 to extend within the transfer sections 152 is that the transfer sections 152 may encompass a larger area of the intermediate transfer film 100 than previously possible. For instance, the transfer ribbons 700 of the prior art, such as that shown in FIG. 7, require the marks 702 to be located outside of the transfer sections 704. As a result, the transfer ribbon 700 must have a width 706 that is sufficient to accommodate the width of the marks 702 and the width of the transfer sections 704. Embodiments of the intermediate transfer film or transfer ribbon 100, on the other hand, include marks 160 that are either entirely within the transfer sections 152 (e.g., marks 160F, 160G, and 160H of FIG. 5), or include at least a portion that is within the transfer section 152 (e.g., marks 160 of FIG. 4, and marks 160I, 160J and 160K of FIG. 5). This allows for a shorter width 164 (FIG. 4) of the intermediate transfer film 100, as compared to prior art transfer ribbons, because it is unnecessary for the film 100 to dedicate a portion of the intermediate transfer film 100 to the width of the marks 160, or at least as much as is necessary in the prior art transfer ribbons. As a result, the width 164 of the intermediate transfer film 100 formed in accordance with embodiments of the invention, may be made much smaller than the width 706 of the transfer ribbons 700 of the prior art. In some embodiments, the width 164 of the intermediate transfer film 100 formed in accordance with embodiments of the invention is selected to merely accommodate tolerances that are necessary to ensure proper widthwise alignment between the intermediate transfer film 100 and the print ribbon 128 and/or the substrate 114.

Having the marks 160 at least overlap the transfer sections 152 also provide advantages with regard to the length of the intermediate transfer ribbon 100, as compared to transfer ribbons 700 of the prior art. For instance, the marks 702 of the transfer ribbon 700 of the prior art must accommodate a length of the marks 702 by providing a sufficient gap between adjacent transfer sections 704, as shown in FIG. 7. As a result, the length of the transfer ribbon 700 not only includes the lengths of the transfer sections 704, but also the length of the gaps between the transfer sections 704 that accommodate the length of the marks 702. In some embodiments, the gap between transfer sections 152 of the intermediate transfer film 100 may be significantly reduced relative to the prior art transfer ribbon 700, or substantially eliminated, by forming the alignment marks 160 within the transfer sections 152, or at least partially within the transfer sections 152. As a result, the length of the intermediate transfer film 100 may be reduced as compared to the prior art transfer ribbon 700 while providing the same sized transfer sections 152. Accordingly, intermediate transfer films formed in accordance with embodiments of the invention may be made more efficiently than the prior art transfer ribbon 700, by, for example, using less materials to form the carrier layer 104 and the transfer film 102. Additionally, it is possible for the device 112 to more efficiently perform print and transfer operations at least due to the reduced distance that the intermediate transfer film 100 must be fed in order to perform a given operation due to the reduced gap between adjacent transfer sections 152.

In some embodiments, the device 112 includes one or more sensors 156 that are configured to detect the marks 160 as the intermediate transfer film 100 is fed in the direction 140. In some embodiments, the sensors 156 are optical sensors that include an emitter 157 and a receiver 158 that are located on opposing sides of the film 100. In some embodiments, the emitter 157 is configured to emit infrared light toward the receiver 158, as indicated in FIG. 2. The controller 113 receives an output signal from the one or more sensors 156 that indicates an intensity of the infrared light received by the receiver 158. When one of the alignment marks 160 is positioned between the transmitter 157 and the receiver 158, the mark 160 absorbs a portion of the transmitted infrared light resulting in a reduced intensity of infrared light reaching the transmitter 158, as compared to when a portion of the intermediate transfer film 100 that does not contain a mark 160 is positioned between the emitter 157 and the receiver 158. This decrease in the intensity of the infrared light received by the receiver 158 is used to sense the mark 160.

In some embodiments, the one or more sensors 156 are located at positions along the path of the immediate transfer film 100 to perform the desired alignment process. In some embodiments, the print unit 124 includes one or more of the sensors 156. For instance, the print unit 124 may include a sensor 156 located downstream of the print head 126, or a sensor 156 (shown in phantom) located upstream of the print head 126, relative to the feed direction 140. In some embodiments, the transfer unit 120 includes one or more of the sensors 156. In some embodiments, a sensor 156 is located upstream (shown) and/or downstream of the heated transfer roller 150 relative to the feed direction 140, as shown in FIG. 2. In some embodiments, the device 112 includes additional sensors for detecting print panels of the print ribbon 128 and/or for detecting the location of the substrates 114 along the processing path 146, in accordance with conventional transfer printers.

In some embodiments, the carrier layer 104 of the intermediate transfer film 100 includes side edges 170 and 172, which define the width 164 of the intermediate transfer film 100, as shown in FIG. 4. In some embodiments, the alignment marks 160 extend substantially from the edge 170 to the edge 172, as shown by the marks 160 in FIG. 4, and the alignment mark 160F of FIG. 5.

As mentioned above, the intermediate transfer film 100 or the carrier layer 104 includes a central axis 163 that extends down the center (widthwise) of the film 100 or carrier layer 104, and along the length of the film 100 or carrier layer 104. In some embodiments, each of the alignment marks 160 extends across the central axis 163, as shown by the exemplary marks 160 of FIG. 4, and the marks 160F and 160G of the film 100 shown in FIG. 5. In some embodiments, the alignment marks 160 are uniformly applied across the width 164 of the film 100 or carrier layer 104 relative to the central axis 163. That is, the marks 160 are substantially equally divided by the central axis 163. Exemplary alignment marks 160 in accordance with this embodiment include the alignment marks 160 of FIG. 4, and alignment marks 160F and 160G of FIG. 5. This eliminates, or at least reduces, the problems with prior art ribbons 700 developing a thicker ridge on one side of the spool of the ribbon due to overlapping marks 702. The uniform application of the marks 160 across the width of the intermediate transfer film 100 prevents such ridges from forming. As a result, spools of the intermediate transfer film 100 formed in accordance with this embodiment, reduce or eliminate the tensioning variances encountered when using non-uniform rolls of conventional transfer ribbon 700 and wrinkling issues caused by such tensioning variances.

One advantage of having the alignment marks 160 extend across the entire width 164 of the film 100, or at least be uniformly distributed in the widthwise direction relative to the central axis 163, is that when the intermediate transfer film 100 is wound on a spool, such as the supply spool 130 or the take-up spool 132 (FIG. 2), a higher ridge on one side of the spool relative to the other side of the spool does not form. When the alignment marks 160 extend substantially across the entire width 164 of the film 100, the thickness of the wound film 100 is substantially continuous across the width 164. As a result, embodiments of the intermediate transfer film 100 avoids the wrinkling issues that may occur when prior art transfer ribbons 700 are used.

In some embodiments, each of the alignment marks 160 includes a leading edge 174, a trailing edge 176, and a length 178 extending between the leading edge 174 and the trailing edge 176, as illustrated on alignment mark 160H of FIG. 5. In some embodiments, the length 178 is greater than or equal to 5.0 mm, 1.0 cm, or 1.5 cm. In some embodiments, the area of each of the alignment marks 160 is greater than 0.4 $cm^2$, greater than 1.0 $cm^2$, or greater than 1.5 $cm^2$.

The marks 160 may take on various shapes. In some embodiments, each of the alignment marks 160 has a rectangular shape.

Additional embodiments of the invention are directed to a method of using the intermediate transfer film 100 to align a transfer section 152 of the film 100 with an object, such as a print head 126, a print panel of the print ribbon 128, a transfer roller 150, or a substrate 114, as described above. In some embodiments of the method, a print section 152 of the transfer layer 102 of the film 100 is aligned to an object of the device 112 by detecting one of the plurality of alignment marks 160 supported on the carrier layer 104, wherein each of the alignment marks 160 is substantially transparent to visible light and absorbs infrared light.

Figure 6:
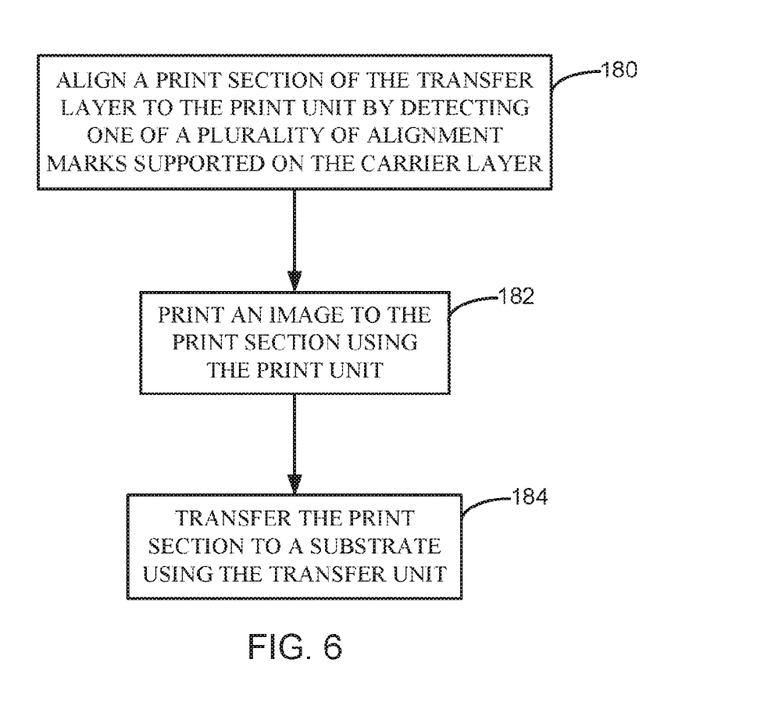
FIG. 6 is a flowchart illustrating a method of operating a transfer lamination device in accordance with embodiments of the invention.

FIG. 6 is a flowchart illustrating a method of operating the device 112 in accordance with embodiments of the invention. At 180 of the method, a transfer section 152 of the transfer layer 102 of the film 100 is aligned to the print unit 124 by detecting one of a plurality of alignment marks 160 supported on the carrier layer 104. In some embodiments of step 180, the transfer section 152 is aligned with the print head 126 of the print unit 124 or a print panel of the print ribbon 128. At 182 of the method, an image is printed to the transfer section 152 using the print unit 124. In some embodiments, the print head 126 is used to print the image to the transfer section 152 such as using the print ribbon 128. At 184 of the method, the transfer section 152 is transferred to a substrate 114 using the transfer unit 120 in accordance with one or more embodiments described above.

Some embodiments of step 180 include the use of a sensor 156 formed in accordance with one or more embodiments described above. In some embodiments, infrared light is emitted from one side of the intermediate transfer film 100 toward the intermediate transfer film 100, such as by an emitter 157 of the sensor 156, as shown in FIG. 2. In some embodiments, blockage or attenuation of the emitted infrared light by one of the plurality of alignment marks 160 is detected using a sensor or receiver 158 located on a side of the intermediate transfer film 100 that is opposite the side of the emitter 157. A processor of the controller 113 receives an output signal from the sensor 156 indicating the blockage or attenuation of the emitted infrared light to detect the mark 160. The alignment of the transfer section 152 to the print unit 124 may occur in response to the detection of the alignment mark 160 in accordance with conventional techniques.

In some embodiments, the transfer step 184 includes aligning the imaged transfer section 152 with the heated transfer roller 150 and/or the substrate 114 using one of the alignment marks 160 in accordance with one or more embodiments described above. The heated transfer roller 150 is then used to heat the transfer section 152 and press the transfer section 152 against the surface 122 of the substrate 114 to transfer the imaged transfer section 152 to the substrate 114 and complete step 184.

Although the present invention has been described with reference to preferred embodiments, workers skilled in the art will recognize that changes may be made in form and detail without departing from the spirit and scope of the invention.

COPYRIGHT AND LEGAL NOTICES

A portion of the disclosure of this patent document contains material which is subject to U.S. copyright protection. The copyright owner has no objection to the facsimile reproduction by anyone of the patent document or the patent disclosure, as it appears in the United States Patent and Trademark Office patent files or records, but otherwise reserves all copyrights whatsoever.

What is claimed is:

1. An intermediate transfer film for use in a transfer lamination device comprising:
   a carrier layer;
   a transfer layer on the carrier layer, the transfer layer is configured to be transferred from the carrier layer to a substrate through a transfer lamination operation; and
   a plurality of alignment marks supported on the carrier layer, wherein each mark is substantially transparent to visible light and absorbs infrared light.

2. The intermediate transfer film of claim 1, wherein each alignment mark is positioned at a location selected from the group consisting of on or in the transfer layer, on the carrier layer, between the transfer layer and the carrier layer, and on a release layer of the transfer film.

3. The intermediate transfer film according to claim 1, wherein each alignment mark includes a portion that is within a transfer section of the transfer layer that is configured to be transferred to a substrate during a transfer lamination operation.

4. The intermediate transfer film according to claim 1, wherein the carrier layer comprises first and second side edges, and each of the alignment marks extends substantially from the first side edge to the second side edge.

5. The intermediate transfer film according claim 1, wherein each alignment mark is uniformly applied across a width of the carrier layer.

6. A method of operating a transfer lamination device that includes a print unit, a transfer unit, and an intermediate transfer film having a carrier layer and a transfer layer, the method comprising:
   aligning a transfer section of the transfer layer to the print unit including detecting one of a plurality of alignment marks supported on the carrier layer, wherein each of the alignment marks is substantially transparent to visible light and absorbs infrared light;
   printing an image to the transfer section using the print unit; and
   transferring the transfer section to a substrate using the transfer unit.

7. The method according to claim 6, wherein detecting an alignment mark comprises:
   emitting infrared light from a first side of the intermediate transfer film toward the intermediate transfer film; and
   detecting blockage of the emitted infrared light by one of the plurality of alignment marks using a sensor located on a second side of the intermediate transfer film, which is opposite the first side, and a controller comprising a processor.

8. The method according to claim 6, wherein at least one of the plurality of alignment marks includes a portion within the transfer section.

9. The method according to claim 8, wherein transferring the print section to a substrate includes transferring the portion of the alignment mark to the substrate.

* * * * *